US012808896B2

(12) United States Patent
Jung et al.

(10) Patent No.: US 12,808,896 B2
(45) Date of Patent: Nov. 24, 2026

(54) DEVICE FOR SENSING WHEEL SPEED

(71) Applicant: HL MANDO CORPORATION, Gyeonggi-do (KR)

(72) Inventors: Yong Kyun Jung, Gyeonggi-do (KR); Jihoon Cho, Gyeonggi-do (KR)

(73) Assignee: HL MANDO CORPORATION, Gyeonggi-do (KR)

(*) Notice: Subject to any disclaimer, the term of this patent is extended or adjusted under 35 U.S.C. 154(b) by 267 days.

(21) Appl. No.: 18/803,761

(22) Filed: Aug. 13, 2024

(65) Prior Publication Data

US 2025/0060388 A1 Feb. 20, 2025

(30) Foreign Application Priority Data

Aug. 18, 2023 (KR) ........................ 10-2023-0108238

(51) Int. Cl.
*G01P 1/02* (2006.01)
*H01R 13/516* (2006.01)

(52) U.S. Cl.
CPC ............ *G01P 1/026* (2013.01); *H01R 13/516* (2013.01)

(58) Field of Classification Search
None
See application file for complete search history.

(56) References Cited

U.S. PATENT DOCUMENTS

| | | | | |
|---|---|---|---|---|
| 7,233,141 B2 * | 6/2007 | Fouquet | B29C 45/1671 324/207.25 |
| 10,871,501 B2 * | 12/2020 | Zhou | G01P 1/026 |
| 2022/0043018 A1 * | 2/2022 | Lim | B60B 27/0005 |

FOREIGN PATENT DOCUMENTS

| | | |
|---|---|---|
| KR | 10-2016-0006294 | 1/2016 |
| KR | 10-2017-0110392 | 10/2017 |
| KR | 10-2023-0003975 | 1/2023 |

OTHER PUBLICATIONS

Office Action dated Jul. 14, 2025 for Korean Patent Application No. 10-2023-0108238 and its English translation from Global Dossier.

* cited by examiner

*Primary Examiner* — Peter J Macchiarolo
*Assistant Examiner* — Jermaine L Jenkins
(74) *Attorney, Agent, or Firm* — WOMBLE BOND DICKINSON (US) LLP

(57) ABSTRACT

A device for sensing wheel speed may include a wheel speed sensor having a sensor body with an embedded first sensor element for sensing the wheel speed of a vehicle, and a first lead frame electrically connected to the first sensor element and extending to the outside of the sensor body; a first cable having a first conductive wire electrically connected to the first lead frame and a first sheath surrounding the first conductive wire; and a first connection member arranged to surround the first lead frame and one end of the first conductive wire that is exposed to one end of the first cable and overlaps the first lead frame, and fixing the first lead frame and the first conductive wire in a contact state.

20 Claims, 10 Drawing Sheets

DEVICE FOR SENSING WHEEL SPEED

CROSS-REFERENCE TO RELATED APPLICATION

This application claims priority to and the benefit from Korean Patent Application No. 10-2023-0108238, filed on Aug. 18, 2023, the disclosure of which is incorporated herein by reference in its entirety.

BACKGROUND

1. Technical Field

The present disclosure generally relates to a device for sensing wheel speed, and more particularly, to a wheel speed sensor for detecting the rotation speed of a vehicle's wheels.

2. Discussion of Related Art

Various devices are installed in vehicles to improve driving and braking stability. For example, ABS (Anti-Lock Brake System) and TCS (Traction Control System) to prevent wheel slip, ESP (Electronic Stability Program) for vehicle posture control, CDC (Continuous Damping Control) which is a suspension system, EPS (Electric Power Steering) to assist steering, or the like are installed.

For control, these devices receive signals from various sensors such as yaw rate sensors, steering angle sensors, wheel speed sensors, brake pressure sensors, and lateral acceleration sensors. Among them, the wheel speed sensor is a key sensor that transmits the vehicle's wheel speed signal, and the majority of electronic control units (ECUs) use the sensing information of wheel speed sensors. Whether ABS, TCS, etc. are operated may be determined through a signal measured by the wheel speed sensor.

For power supply and signal transmission, the wheel speed sensor may be connected to the cable. Generally, a wheel speed sensor may comprise an IC chip with a lead frame, and the wire of the cable may be connected to the lead frame. Conventionally, methods such as welding are used, but there is a problem in terms of securing connection quality and process efficiency.

In addition, there is a growing need to arrange two wheel speed sensors for each wheel of the vehicle to improve detection accuracy, reliability, or redundancy. Accordingly, it is also needed to develop a sensor mounting technology that can provide assemblability and space efficiency while stably aligning the two wheel speed sensors so that the two wheel speed sensors operate stably.

SUMMARY

The present disclosure is to solve the above problems, and is directed to providing a device for sensing wheel speed in which connection between a wheel speed sensor and a cable can be achieved efficiently.

The present disclosure is also directed to providing a device for sensing wheel speed in which connection between a cable and a lead frame is effectively achieved by exposing the lead frame of the wheel speed sensor to the outside by a wheel speed sensor holder on which the wheel speed sensor is seated.

The present disclosure is also directed to providing a device for sensing wheel speed in which connection between a lead frame of a wheel speed sensor and a cable is easily achieved while the cable and a connection member are coupled to a cable holder.

The present disclosure is also directed to providing a device for sensing wheel speed in which a plurality of wheel speed sensors are efficiently aligned and connected to a cable.

The present disclosure is also directed to providing a device for sensing wheel speed in which arrangement and alignment of a plurality of cables are effectively achieved.

The objects of the present disclosure are not limited to the above-described objects, and other objects that are not mentioned will be able to be clearly understood by those skilled in the art to which the present disclosure pertains from the following description.

According to an aspect of the present disclosure, provided is a device for sensing wheel speed, including: a wheel speed sensor having a sensor body with an embedded first sensor element for sensing the wheel speed of a vehicle, and a first lead frame electrically connected to the first sensor element and extending to the outside of the sensor body; a first cable having a first conducting wire electrically connected to the first lead frame and a first sheath surrounding the first conducting wire; and a first connection member arranged to surround the first lead frame and one end of the first conducting wire that is exposed to one end of the first cable and overlaps the first lead frame, and fixing the first lead frame and the first conducting wire in a contact state.

In the device for sensing wheel speed according to an aspect of the present disclosure, the first connection member may have a first connection body, and a first connection hole penetrating one side and the other side of the first connection body and in which the first lead frame and one end of the first conducting wire are disposed to overlap.

In the device for sensing wheel speed according to an aspect of the present disclosure, the first connection body may have a rectangular box shape, and the first connection hole may have a rectangular shape.

In the device for sensing wheel speed according to an aspect of the present disclosure, the wheel speed sensor may further have a second lead frame electrically connected to the first sensor element and extending to the outside of the sensor body, and the device for sensing wheel speed may further include: a second cable having a second conducting wire electrically connected to the second lead frame and a second sheath surrounding the second conducting wire; and a second connection member arranged to surround the second lead frame and one end of the second conducting wire that is exposed to one end of the second cable and overlaps the lead frame, and fixing the second lead frame and the second conducting wire in a contact state.

In the device for sensing wheel speed according to an aspect of the present disclosure, the first connection member and the second connection member may be arranged side by side.

The device for sensing wheel speed according to an aspect of the present disclosure may further include a wheel speed sensor holder on which the wheel speed sensor is seated.

In the device for sensing wheel speed according to an aspect of the present disclosure, the wheel speed sensor holder may include a seating part on which the sensor body is seated; and a support part connected to the seating part and supporting the first and second lead frames.

In the device for sensing wheel speed according to an aspect of the present disclosure, the support part may have a shorter length than the first and second lead frames.

The device for sensing wheel speed according to an aspect of the present disclosure may further include a cable holder on which the first and second cables are seated.

In the device for sensing wheel speed according to an aspect of the present disclosure, the first and second connection members may be fixedly disposed in the cable holder.

In the device for sensing wheel speed according to an aspect of the present disclosure, the cable holder may include a connection part having first and second through holes in which the first and second lead frames are inserted and disposed through the front, respectively, and each one end of the first and second conducting wires are inserted and disposed through the rear, respectively, and in which the first and second connection members are fixedly disposed, respectively.

In the device for sensing wheel speed according to an aspect of the present disclosure, the cable holder may further include a cable support part connected to the rear of the connection part and extending to support the first and second cables.

The device for sensing wheel speed according to an aspect of the present disclosure may further include an additional sheathing member disposed at the rear of the cable support part and surrounding the first and second cables.

In the device for sensing wheel speed according to an aspect of the present disclosure, the cable holder may further include an additional sheathing member support part connected to the rear of the cable support part and on which the additional sheathing member is seated and supported.

According to another aspect of the present disclosure, provided is a device for sensing wheel speed, including: a wheel speed sensor having a sensor body with an embedded first sensor element and an embedded second sensor element for sensing the wheel speed of a vehicle, and first and second lead frames electrically connected to the first sensor element and extending to the outside of the sensor body, and third and fourth lead frames electrically connected to the second sensor element and extending to the outside of the sensor body; a first cable having a first conducting wire electrically connected to the first lead frame and a first sheath surrounding the first conducting wire; a second cable having a second conducting wire electrically connected to the second lead frame and a second sheath surrounding the second conducting wire; a third cable having a third conducting wire electrically connected to the third lead frame and a third sheath surrounding the third conducting wire; a fourth cable having a fourth conducting wire electrically connected to the fourth lead frame and a fourth sheath surrounding the fourth conducting wire; a first connection member arranged to surround the first lead frame and one end of the first conducting wire that is exposed to one end of the first cable and overlaps the first lead frame, and fixing the first lead frame and the first conducting wire in a contact state; a second connection member arranged to surround the second lead frame and one end of the second conducting wire that is exposed to one end of the second cable and overlaps the second lead frame, and fixing the second lead frame and the second conducting wire in a contact state; a third connection member arranged to surround the third lead frame and one end of the third conducting wire that is exposed to one end of the third cable and overlaps the third lead frame, and fixing the third lead frame and the third conducting wire in a contact state; a fourth connection member arranged to surround the fourth lead frame and one end of the fourth conducting wire that is exposed to one end of the fourth cable and overlaps the fourth lead frame, and fixing the fourth lead frame and the fourth conducting wire in a contact state; and a cable holder having a connection part having first to fourth through holes in which the first to fourth lead frames are inserted and disposed through the front, respectively, and each one end of the first to fourth conducting wires are inserted and disposed through the rear, respectively.

In the device for sensing wheel speed according to another aspect of the present disclosure, the first to fourth connection members may be fixedly disposed in the first to fourth through holes, respectively.

In the device for sensing wheel speed according to another aspect of the present disclosure, the first to fourth connection members may be arranged side by side.

In the device for sensing wheel speed according to another aspect of the present disclosure, the first connection member may have a first connection body, and a first connection hole penetrating one side and the other side of the first connection body and in which the first lead frame and one end of the first conducting wire are disposed to overlap, and the second to fourth connection members may have second to fourth connection bodies corresponding to the first connection body and second to fourth connection holes corresponding to the first connection hole, respectively.

In the device for sensing wheel speed according to another aspect of the present disclosure, the first connection body may have a rectangular box shape, and the first connection hole may have a rectangular shape.

The device for sensing wheel speed according to another aspect of the present disclosure may further include a wheel speed sensor holder on which the wheel speed sensor is seated.

In the device for sensing wheel speed according to another aspect of the present disclosure, the wheel speed sensor holder may include a seating part on which the sensor body is seated; and a support part connected to the seating part and supporting the first to fourth lead frames.

In the device for sensing wheel speed according to another aspect of the present disclosure, the support part may have a shorter length than the first to fourth lead frames.

In the device for sensing wheel speed according to another aspect of the present disclosure, the cable holder may be connected to the rear of the connection part, and the device for sensing wheel speed may further include a cable support part extending to support the first to fourth cables.

The device for sensing wheel speed according to another aspect of the present disclosure may further include an additional sheathing member disposed at the rear of the cable support part and surrounding the first to fourth cables.

In the device for sensing wheel speed according to another aspect of the present disclosure, the first to fourth cables may be arranged in two rows and two columns inside the additional sheathing member.

In the device for sensing wheel speed according to another aspect of the present disclosure, the cable holder may further include an additional sheathing member support part connected to the rear of the cable support part and on which the additional sheathing member is seated and supported.

In the device for sensing wheel speed according to another aspect of the present disclosure, the bottom surface of the cable support part may include a portion inclined upward from the additional sheathing member support part side to the connection part side.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
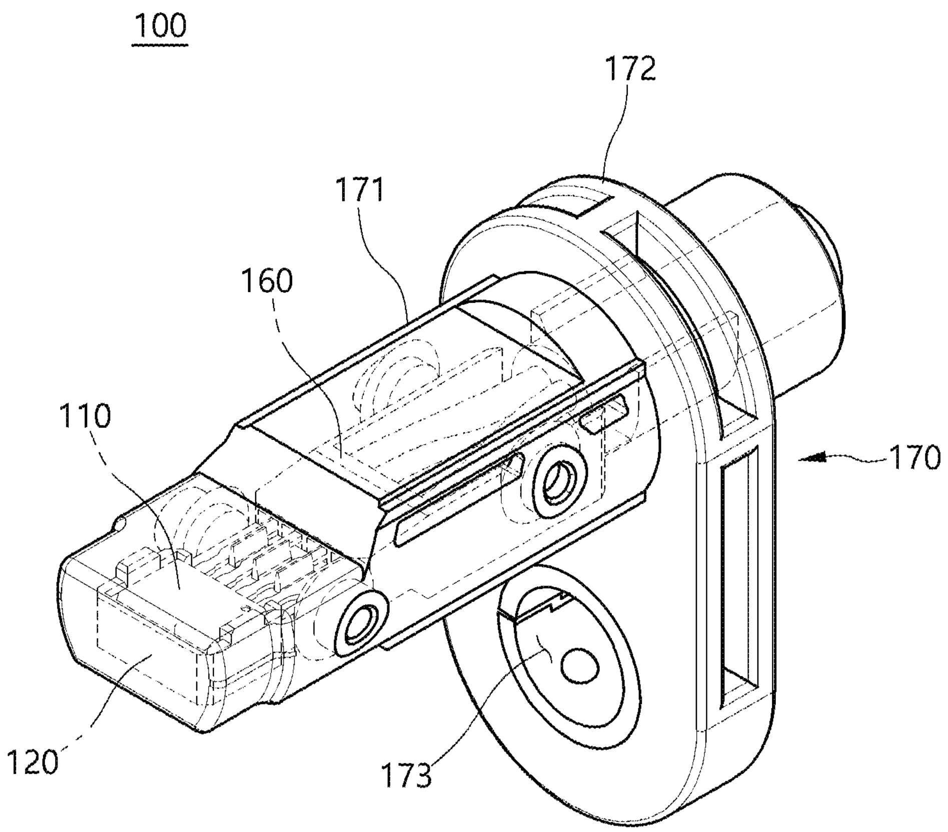
FIG. 1 is a front perspective view of a device for sensing wheel speed according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
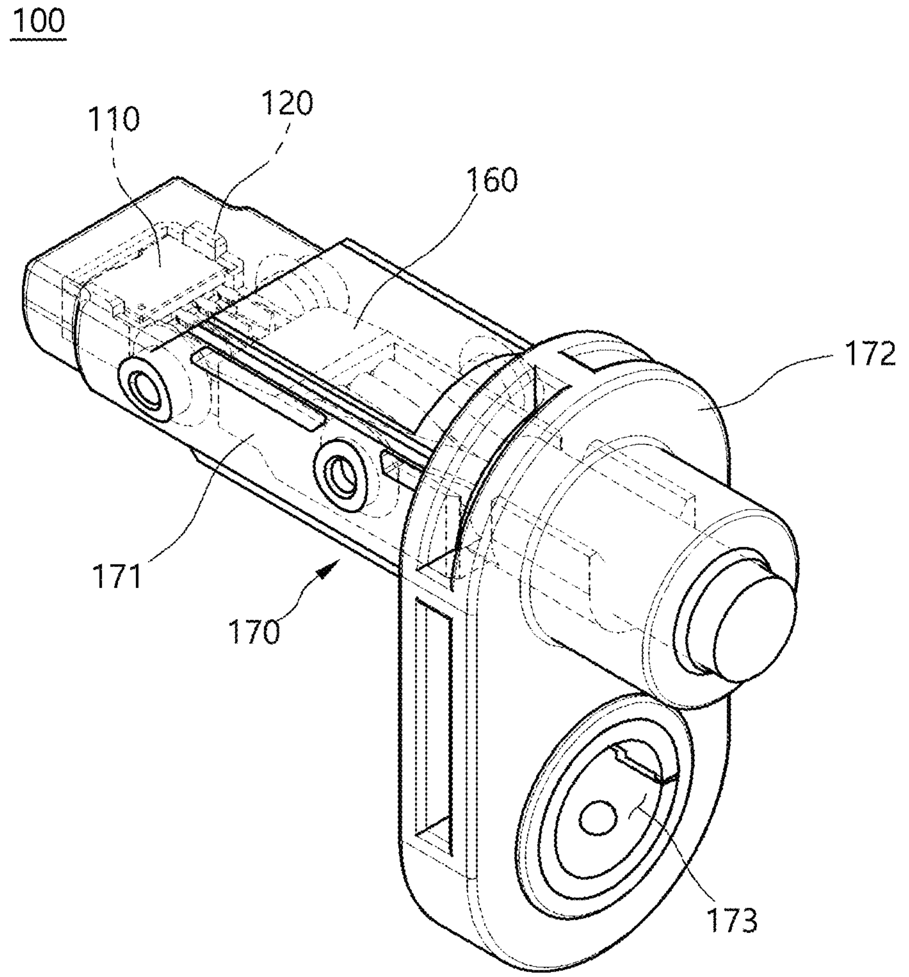
FIG. 2 is a rear perspective view of a device for sensing wheel speed according to an exemplary embodiment of the present disclosure.
Figure 3:
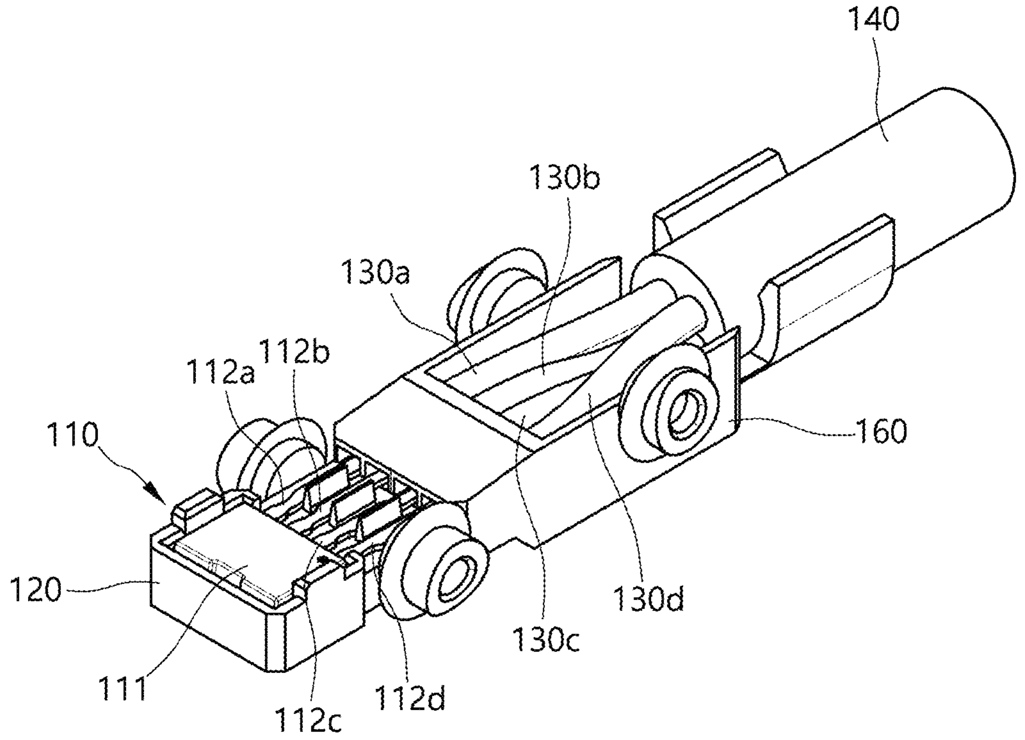
FIG. 3 is a view illustrating a device for sensing wheel speed without a housing according to an exemplary embodiment of the present disclosure.
Figure 4:
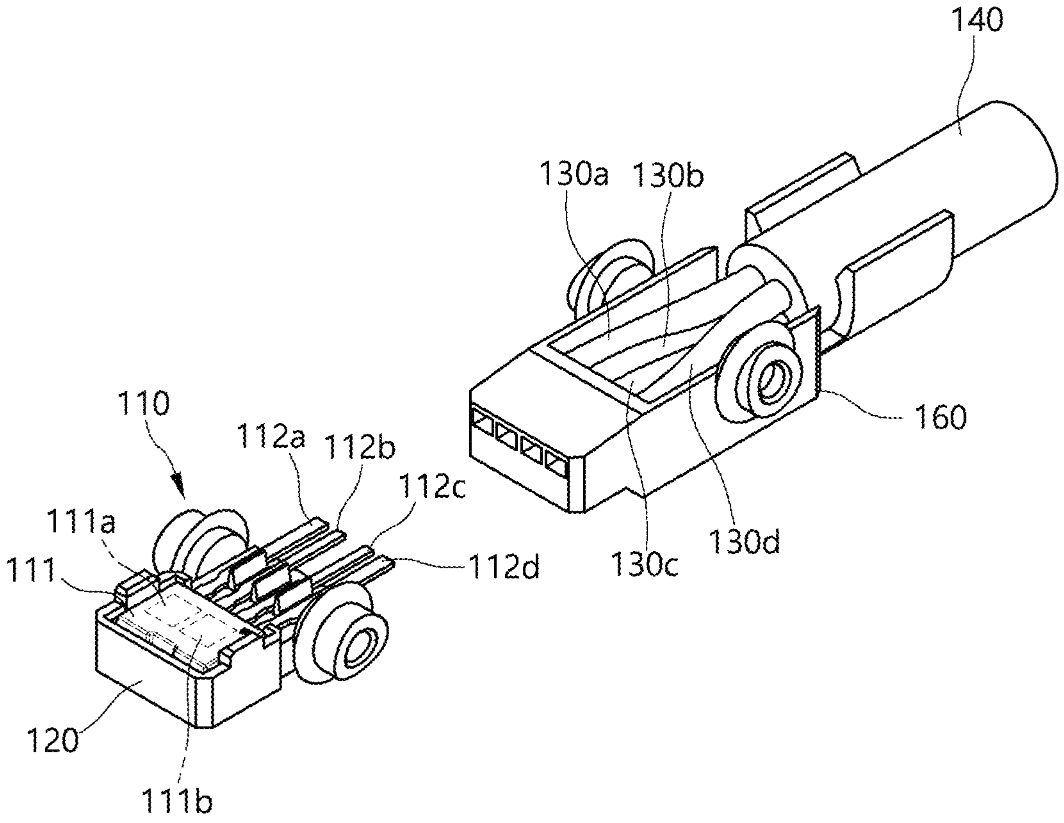
FIG. 4 is an exploded view in which a wheel speed sensor assembly and a cable of a device for sensing wheel speed are separated according to an exemplary embodiment of the present disclosure.

FIG. 1 is a front perspective view of a device for sensing wheel speed according to an exemplary embodiment of the present disclosure. FIG. 2 is a rear perspective view of a device for sensing wheel speed according to an exemplary embodiment of the present disclosure. In addition, FIG. 3 is a view illustrating a device for sensing wheel speed without a housing according to an exemplary embodiment of the present disclosure. FIG. 4 is an exploded view in which a wheel speed sensor assembly and a cable of a device for sensing wheel speed are separated according to an exemplary embodiment of the present disclosure.

The device for sensing wheel speed 100 according to an embodiment of the present disclosure may detect the rotation of a tone wheel or encoder coupled to a wheel of a vehicle. The tone wheel or encoder rotates together with the wheel of the vehicle, and the device for sensing wheel speed 100 according to an embodiment of the present disclosure may detect the number of revolutions of the tone wheel or encoder.

Referring to FIGS. 1 to 4, the device for sensing wheel speed 100 according to an embodiment of the present disclosure may include a wheel speed sensor assembly 110, a wheel speed sensor holder 120, first to fourth cables 130*a*, 130*b*, 130*c*, and 130*d*, an additional sheathing member 140, first to fourth connection members or connectors 150*a*, 150*b*, 150*c*, and 150*d*, a cable holder 160, and a housing 170.

The wheel speed sensor assembly 110 may include a sensor body 111 and first to fourth lead frames 112*a*, 112*b*, 112*c*, 112*d*.

A first sensor element 111*a* and a second sensor element 111*b* for sensing a wheel speed of a vehicle may be embedded in the sensor body 111. The first sensor element 111*a* and the second sensor element 111*b* may detect a tone wheel or an encoder that rotates together with the wheel of the vehicle. For example, the first sensor element 111*a* and the second sensor element 111*b* may be hall sensors.

In an embodiment of the present disclosure, the first sensor element 111*a* and the second sensor element 111*b* may be arranged side by side inside the sensor body 111. For example, the first sensor element 111*a* and the second sensor element 111*b* may be arranged side by side in the horizontal direction inside the sensor body 111.

Each of the first sensor element 111*a* and the second sensor element 111*b* may be configured as a separate die. In addition, the sensor body 111 may be configured by assembling or molding two dies into one.

The first and second lead frames 112*a* and 112*b* are electrically connected to the first sensor element 111*a* and extend to the outside of the sensor body 111. The first lead frame 112*a* may connect the first sensor element 111*a* and a power source. In addition, the second lead frame 112*b* may transmit the sensing information of the first sensor element 111*a* to the outside (e.g., ECU).

Alternatively, the first lead frame 112*a* may transmit the sensing information of the first sensor element 111*a* to the outside, and the second lead frame 112*b* may be connected to a power source.

The first lead frame 112*a* and the second lead frame 112*b* may be arranged side by side with each other. In more detail, the first lead frame 112*a* and the second lead frame 112*b* may be arranged side by side in the horizontal direction. In addition, the first lead frame 112*a* and the second lead frame 112*b* may have the same length.

The third and fourth lead frames 112*c* and 112*d* are electrically connected to the second sensor element 111*b* and extend to the outside of the sensor body 111. The third lead frame 112*c* may connect the second sensor element 111*b* and a power source. In addition, the fourth lead frame 112*d* may transmit the sensing information of the second sensor element 111*b* to the outside (e.g., ECU).

Alternatively, the third lead frame 112*c* may transmit the sensing information of the second sensor element 111*b* to the outside, and the fourth lead frame 112*d* may be connected to a power source.

The third lead frame 112*c* and the fourth lead frame 112*d* may be arranged side by side with each other. For instance, the third lead frame 112*c* and the fourth lead frame 112*d* may be arranged side by side in the horizontal direction. In addition, the third lead frame 112*c* and the fourth lead frame 112*d* may have the same length.

The first to fourth lead frames 112*a*, 112*b*, 112*c*, and 112*d* may be arranged side by side in the horizontal direction. In addition, the first to fourth lead frames 112*a*, 112*b*, 112*c*, and 112*d* may have the same length.

In this way, when the wheel speed sensor assembly 110 is configured such that the first sensor element 111*a* and the second sensor element 111*b* are embedded in one sensor body 111, space required for arranging the two sensor elements may be reduced or minimized. In addition, the arrangement of the two sensor elements may also be made through a single process. Accordingly, space efficiency and assemblability can be improved.

The wheel speed sensor holder 120 accommodates the wheel speed sensor assembly 110. The wheel speed sensor assembly 110 may be seated on the wheel speed sensor holder 120.

Figure 5:
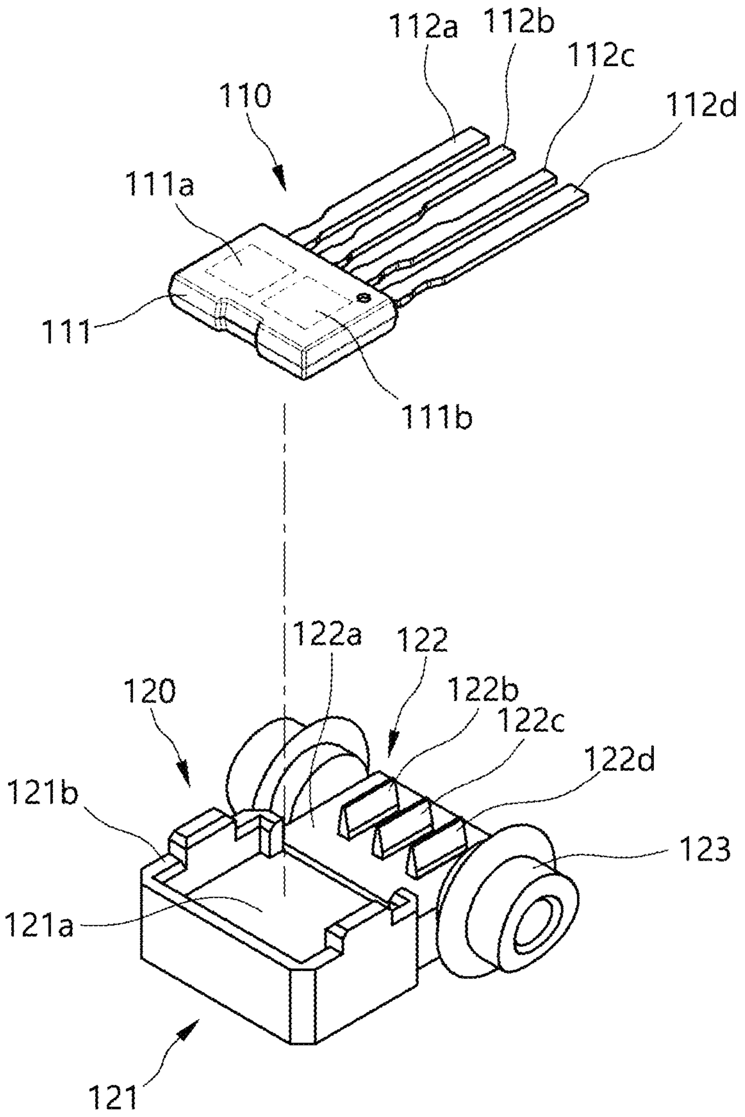
FIG. 5 is an exploded view in which a wheel speed sensor assembly and a wheel speed sensor holder of a device for sensing wheel speed are separated according to an exemplary embodiment of the present disclosure.

FIG. 5 is an exploded view in which a wheel speed sensor assembly and a wheel speed sensor holder of a device for sensing wheel speed are separated according to an exemplary embodiment of the present disclosure.

Referring to FIG. 5, the wheel speed sensor holder 120 may include a seat part 121 and a support part 122.

The seat part 121 accommodates the sensor body 111. The sensor body 111 may be seated on the seat part 121. In an embodiment of the present disclosure, the seat part 121 may include a sensor seat plate 121*a* on which the bottom surface of the sensor body 111 is seated, and a sensor support sidewall 121*b* protruding upward from the sensor seating plate 121*a* to support the side surface of the sensor body 111. The sensor support sidewall 121*b* may be provided to surround the remaining portion of the side surface of the sensor body 111 except for a portion where the lead frame extends.

The support part 122 is connected to the seat part 121. The support part 122 supports the first to fourth lead frames 112*a*, 112*b*, 112*c*, and 112*d*. The support part 122 may have a length shorter than those of the first to fourth lead frames 112*a*, 112*b*, 112*c*, and 112*d*. Accordingly, when the first to fourth lead frames 112*a*, 112*b*, 112*c*, and 112*d* approach the wheel speed sensor holder 120 toward the cable holder 160 to be described later to connect the first to fourth cables 130*a*, 130*b*, 130*c*, and 130*d*, interference may not occur, and connection between the lead frame and the cable may be easily performed.

The support part 122 may include a lead frame support plate 122*a* supporting the first to fourth lead frames 112*a*, 112*b*, 112*c*, and 112*d*, and a plurality of lead frame support sidewalls 122*b*, 122*c*, and 122*d* protruding upward from the lead frame support plate 122*a* to support side surfaces of the first to fourth lead frames 112*a*, 112*b*, 112*c*, and 112*d* between the first lead frame 112*a* and the second lead frame 112*b*, between the second lead frame 112*b* and the third lead frame 112*c*, and between the third lead frame 112*c* and the fourth lead frame 112*d*.

Widths of the plurality of lead frame support sidewalls 122*b*, 122*c*, and 122*d* may be formed to be wider at the lower side than at the upper side. This structure may allow the first to fourth lead frames 112*a*, 112*b*, 112*c*, and 112*d* to easily enter toward the lead frame support plate 122*a* from the upper side of the lead frame support plate 122*a*. In addition, this structure may enable the first to fourth lead frames 112*a*, 112*b*, 112*c*, and 112*d* to be stably supported after the wheel speed sensor assembly 110 is seated on the wheel speed sensor holder 120.

In an embodiment of the present disclosure, the wheel speed sensor holder 120 may have one or more side beams 123. The side beam 123 may be disposed to extend laterally from both sides of the seat part 121 or the support part 122. For example, the side beam 123 may be disposed to extend laterally from both sides of the lead frame support plate 122*a*. The side beam 123 may be used to fix the housing 170 in a mold when molding the housing 170.

Figure 6:
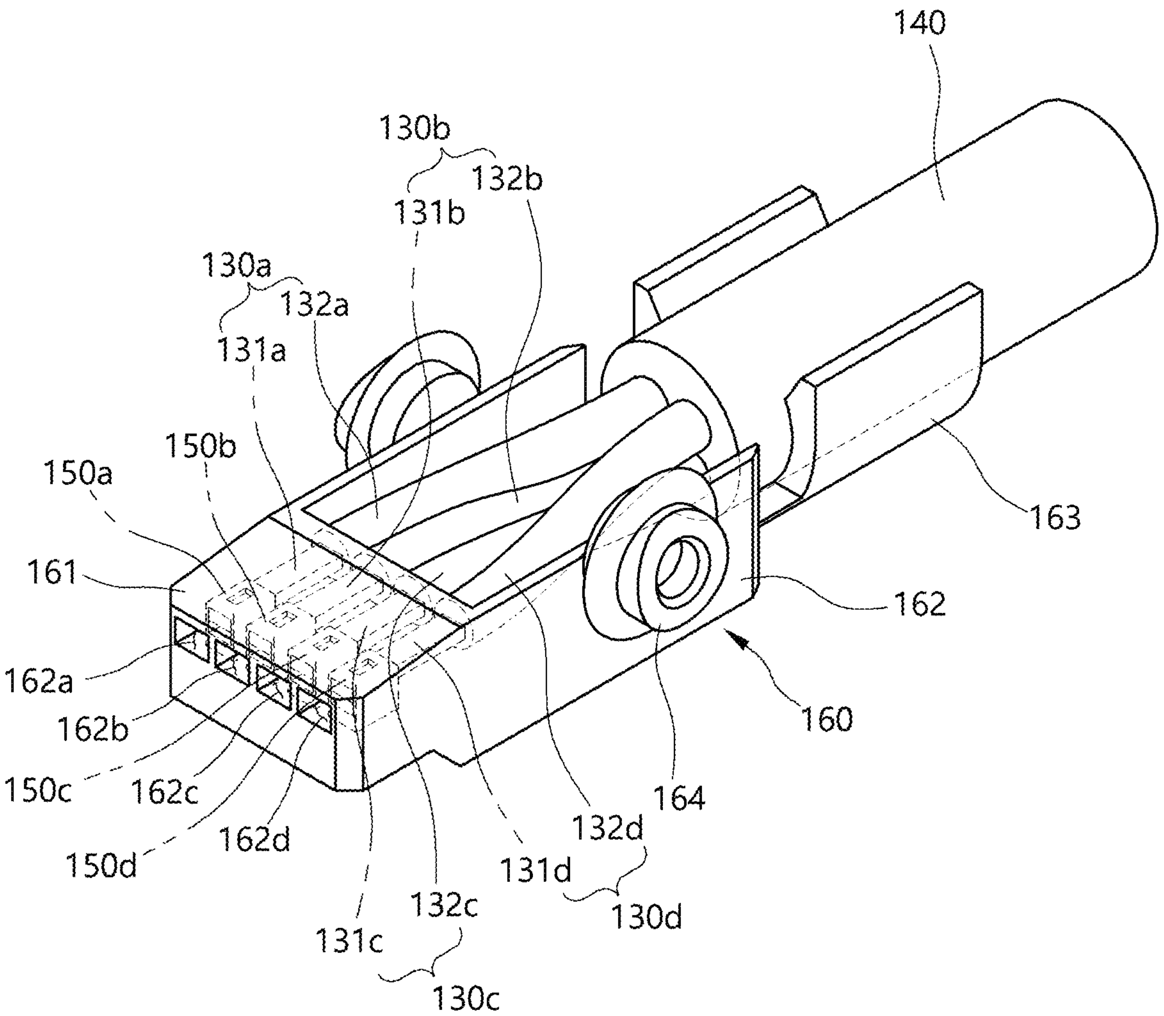
FIG. 6 is a view in which a cable, a connection member or connector, and a cable holder of a device for sensing wheel speed are coupled according to an exemplary embodiment of the present disclosure.

FIG. 6 is a view a cable, a connection member or connector, and a cable holder of a device for sensing wheel speed are coupled according to an exemplary embodiment of the present disclosure. In addition, FIG. 7 is an exploded view in which a cable and a cable holder of a device for sensing wheel speed are separated according to an exemplary embodiment of the present disclosure.

Figure 7:
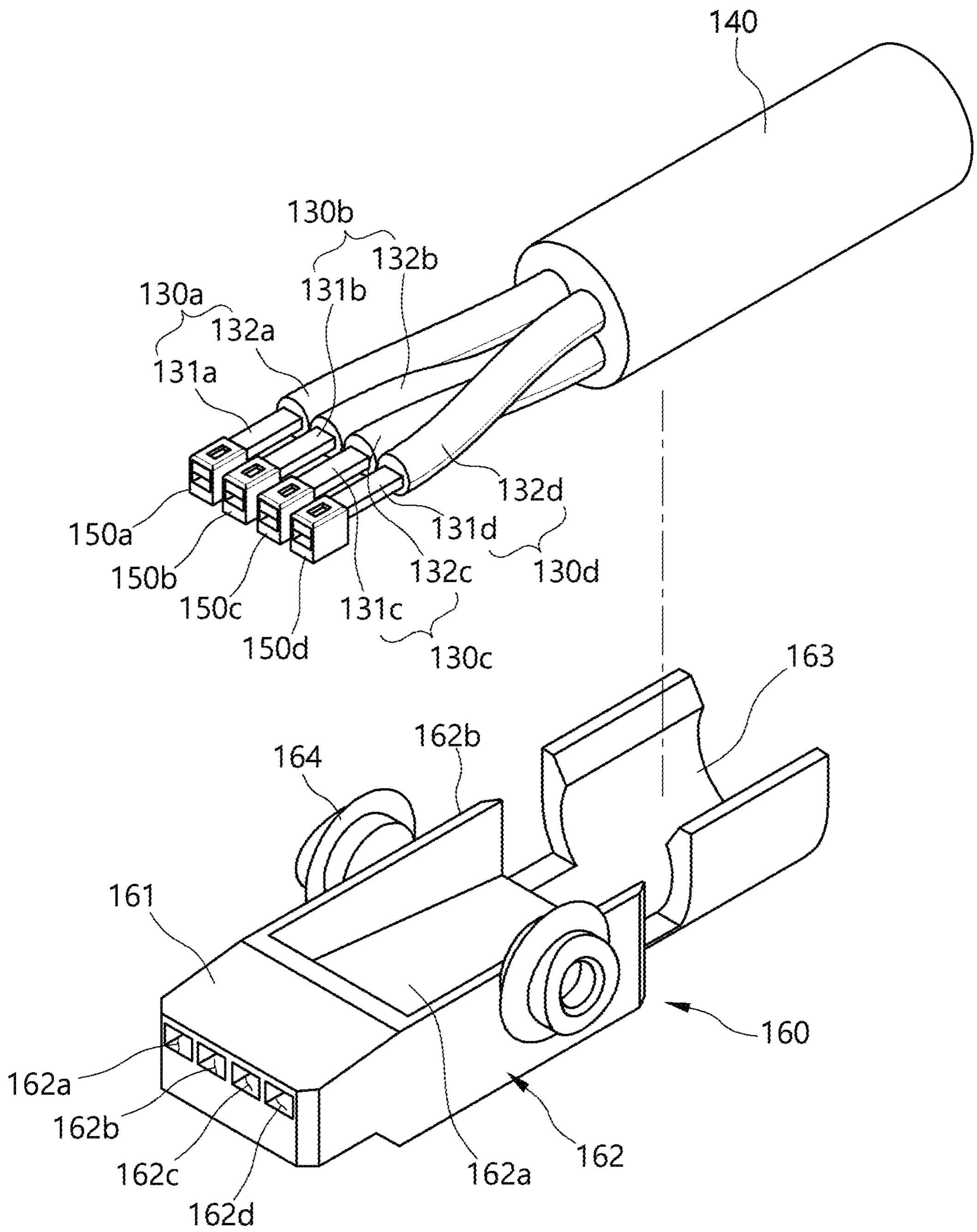
FIG. 7 is a view in which a cable and a cable holder of a device for sensing wheel speed are separated according to an exemplary embodiment of the present disclosure.

Referring to FIGS. 6 and 7, the first cable 130*a* has a first conductive wire 131*a* electrically connected to the first lead frame 112*a* and a first sheath 132*a* covering or surrounding the first conductive wire 131*a*. The second cable 130*b* has a second conductive wire 131*b* electrically connected to the second lead frame 112*b* and a second sheath 132*b* surrounding the second conductive wire 131*b*.

The first conductive wire 131*a* may be for supplying power. The second conductive wire 131*b* may be for transmitting a signal. Alternatively, the first conductive wire 131*a* may be for transmitting a signal, and the second conductive wire 131*b* may be for supplying power.

The first sheath 132*a* insulates the first conductive wire 131*a* from the outside. In addition, the second sheath 132*b* insulates the second conductive wire 131*b* from the outside of the first cable 130*a*.

One end of the first conductive wire 131*a* is exposed out of one end of the first sheath 132*a* of the first cable 130*a*. One end of the first conductive wire 131*a* exposed to one end of the first cable 130*a* is connected to the first lead frame 112*a*. In an embodiment of the present disclosure, one end of the first conductive wire 131*a* may be disposed to overlap or contact the first lead frame 112*a*.

One end of the second conductive wire 131*b* is exposed to one end of the second sheath 132*b* of the second cable 130*b*. One end of the second conductive wire 131*b* exposed to one end of the second cable 130*b* is connected to the second lead frame 112*b*. In an embodiment of the present disclosure, one end of the second conductive wire 131*b* may be disposed to overlap or contact the second lead frame 112*b*.

Referring to FIGS. 6 and 7, the third cable 130*c* has a third conductive wire 131*c* electrically connected to the third lead frame 112*c* and a third sheath 132*c* covering or surrounding the third conductive wire 131*c*. The fourth cable 130*d* has a fourth conductive wire 131*d* electrically connected to the fourth lead frame 112*d* and a fourth sheath 132*d* surrounding the fourth conductive wire 131*d*.

The third conductive wire 131*c* may be for supplying power. The fourth conductive wire 131*d* may be for transmitting a signal. Alternatively, the third conductive wire 131*c* may be for transmitting a signal, and the fourth conductive wire 131*d* may be for supplying power.

In addition, the third sheath 132*c* insulates the third conductive wire 131*c* from the outside of the third conductive wire 131*c*. In addition, the fourth sheath 132*d* insulates the fourth conductive wire 131*d* from the outside of the fourth sheath 132*d*.

One end of the third conductive wire 131*c* is exposed out of the third sheath 132*c* of one end of the third cable 130*c*. One end of the third conductive wire 131*c* exposed to one end of the third cable 130*c* is connected to the third lead frame 112*c*. In an embodiment of the present disclosure, one end of the third conductive wire 131*c* may be disposed to overlap or contact the third lead frame 112*c*.

One end of the fourth conductive wire 131*d* is exposed out of the fourth sheath 132*d* of one end of the fourth cable 130*d*. One end of the fourth conductive wire 131*d* exposed to one end of the fourth cable 130*d* is connected to the fourth lead frame 112*d*. In an embodiment of the present disclosure, one end of the fourth conductive wire 131*d* may be disposed to overlap or contact the fourth lead frame 112*d*.

Meanwhile, each one end of the first to fourth conductive wires 131*a*, 131*b*, 131*c*, and 131*d* exposed to respective one end of the first to fourth cables 130*a*, 130*b*, 130*c*, and 130*d* may be disposed in a compressed state. In more detail, since the contact surfaces of the first to fourth lead frames 112*a*, 112*b*, 112*c*, and 112*d* are formed substantially flat, each one end of the first to fourth conductive wires 131*a*, 131*b*, 131*c*, and 131*d* exposed to respective one end of the first to fourth cables 130*a*, 130*b*, 130*c*, and 130*d* to increase a contact area may be compressed in a substantially rectangular rod shape.

The additional sheathing member 140 is arranged to cover or surround the first to fourth cables 130*a*, 130*b*, 130*c*, and 130*d*. The additional sheathing member 140 may have a substantially cylindrical shape.

Referring to FIGS. 6 and 7, the first to fourth cables 130*a*, 130*b*, 130*c*, and 130*d* may be arranged in two rows and two columns inside the additional sheathing member 140.

When the first to fourth cables 130*a*, 130*b*, 130*c*, and 130*d* are respectively connected to the outside of the device for sensing wheel speed 100, twisting, interference, and the like between cables may occur. The additional sheathing member 140 makes the first to fourth cables 130*a*, 130*b*, 130*c*, and 130*d* into one composite cable, thereby increasing the efficiency of wiring between the device for sensing wheel speed 100 and an external power source or ECU.

The first to fourth cables 130*a*, 130*b*, 130*c*, and 130*d* may be exposed to one end of the additional sheathing member 140. That is, the first to fourth cables 130*a*, 130*b*, 130*c*, and 130*d* are exposed to one end of the additional sheathing member 140. In addition, the first to fourth conductive wires 131*a*, 131*b*, 131*c*, and 131*d* may be respectively exposed to one end of the first to fourth cables 130*a*, 130*b*, 130*c*, and 130*d* exposed to one end of the additional sheathing member 140.

Based on the cable holder 160 to be described later, the additional sheathing member 140 may be arranged behind a cable support part 162 of the cable holder 160 to surround the first to fourth cables 130*a*, 130*b*, 130*c*, and 130*d*.

A first connection member or connector 150*a* is arranged to cover or surround the first lead frame 112*a* and one end of the first conductive wire 131*a* that is exposed to one end of the first cable 130*a* and overlaps or contacts the first lead frame 112*a*. The first connection member or connector 150*a* fixes the first lead frame 112*a* and the first conductive wire 131*a* in a contact state.

Figure 8:
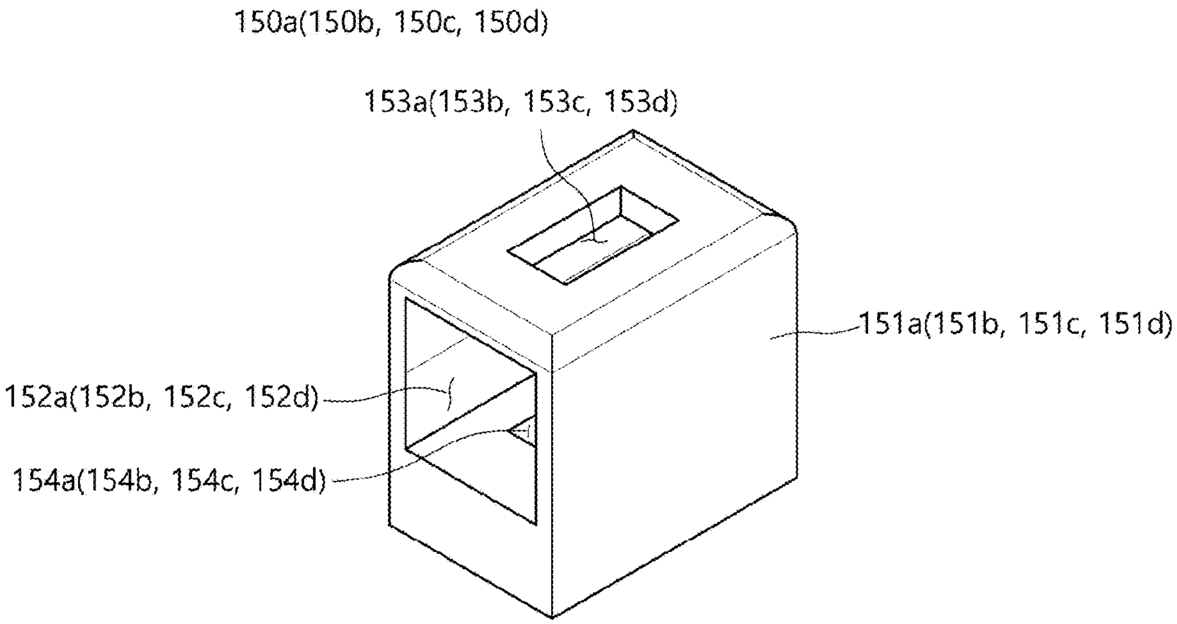
FIG. 8 is an upper perspective view of a connection member or connector of a device for sensing wheel speed according to an exemplary embodiment of the present disclosure.

FIG. 8 is an upper perspective view of a connection member or connector of a device for sensing wheel speed according to an exemplary embodiment of the present disclosure. In addition, FIG. 9 is a lower perspective view of a connection member or connector of a device for sensing wheel speed according to an exemplary embodiment of the present disclosure.

Figure 9:
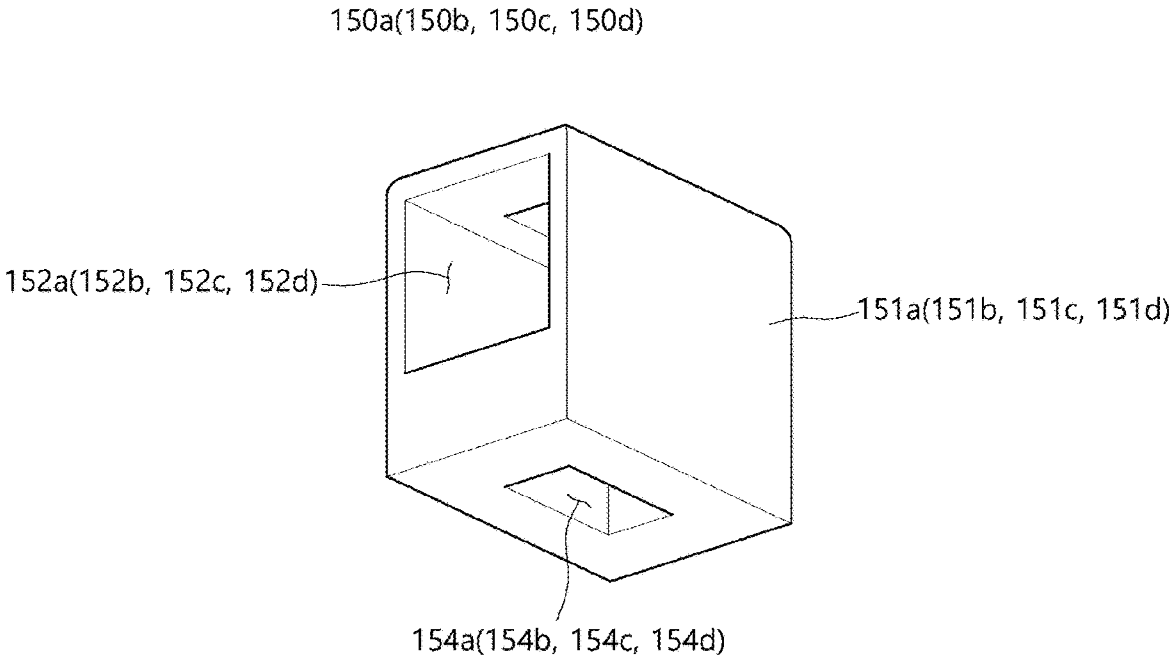
FIG. 9 is a lower perspective view of a connection member or connector of a device for sensing wheel speed according to an exemplary embodiment of the present disclosure.

Referring to FIGS. 8 and 9, the first connection member or connector 150*a* may have a first connection body 151*a*, and a first connection hole 152*a* penetrating one side and the other side of the first connection body 151*a* and in which the first lead frame 112*a* and one end of the first conductive wire 131*a* are disposed to overlap or contact each other. In this case, the first connection body 151*a* may have a substantially rectangular box shape, and the first connection hole 152*a* may have a substantially rectangular shape.

The first lead frame 112*a* and one end of the first conductive wire 131*a* are arranged to be stacked in an overlapping manner inside the first connection hole 152*a*, and the first lead frame 112*a* and the first conductive wire 131*a* may be fixed in a contact state by the first connection body 151*a*. As described above, since the first lead frame 112*a* and one end of the first conductive wire 131*a* have a substantially rectangular rod shape, a contact state may be efficiently maintained inside the first connection hole 152*a* having a substantially rectangular shape.

A second connection member or connector 150*b* is arranged to cover or surround the second lead frame 112*b* and one end of the second conductive wire 131*b* that is exposed to one end of the second cable 130*b* and overlaps or contacts the second lead frame 112*b*. The second connection member or connector 150*b* fixes the second lead frame 112*b* and the second conductive wire 131*b* in a contact state.

A third connection member or connector 150*c* is arranged to surround or cover the third lead frame 112*c* and one end of the third conductive wire 131*c* that is exposed to one end of the third cable 130*c* and overlaps or contacts the third lead frame 112*c*. The third connection member or connector 150*c* fixes the third lead frame 112*c* and the third conductive wire 131*c* in a contact state.

A fourth connection member or connector 150*d* is arranged to cover or surround the fourth lead frame 112*d* and one end of the fourth conductive wire 131*d* that is exposed to one end of the fourth cable 130*d* and overlaps or contacts the fourth lead frame 112*d*. The fourth connection member or connector 150*d* fixes the fourth lead frame 112*d* and the fourth conductive wire 131*d* in a contact state.

Referring to FIGS. 8 and 9, the second to fourth connection members or connectors 150*b*, 150*c*, and 150*d* may have a connection body corresponding to the first connection body 151*a* and a connection hole corresponding to the first connection hole 152*a*, respectively. That is, the second to fourth connection members or connectors 150*b*, 150*c*, and 150*d* may have second to fourth connection bodies 151*b*, 151*c*, and 151*d* and second to fourth connection holes 152*b*, 152*c*, and 152*d*, respectively. In this case, the second to fourth connection bodies 151*b*, 151*c*, and 151*d* may have a substantially rectangular box shape, and the second to fourth connection holes 152*b*, 152*c*, and 152*d* may have a substantially rectangular shape.

In an embodiment of the present disclosure, the first to fourth connection members or connectors 150*a*, 150*b*, 150*c*, and 150*d* may be arranged side by side. Accordingly, connection between the first to fourth lead frames 112*a*, 112*b*, 112*c*, and 112*d* and the first to fourth conductive wires 131*a*, 131*b*, 131*c*, and 131*d* may be efficiently achieved.

Figure 10:
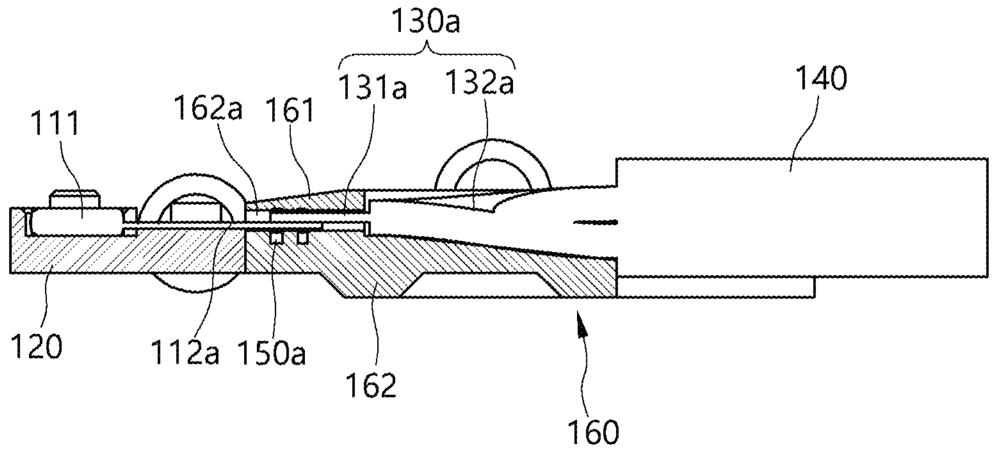
FIG. 10 is a view illustrating a longitudinal cross-section of a device for sensing wheel speed according to an exemplary embodiment of the present disclosure.

FIG. 10 is a view illustrating a longitudinal cross-section of a device for sensing wheel speed according to an exemplary embodiment of the present disclosure.

Referring to FIG. 10, in an embodiment of the present disclosure, the first connection member or connector 150*a* is fixedly placed in the connection part 161 of the cable holder 160, which will be described later, while being inserted into one end of the first conductive wire 131*a* of the first cable 130*a*. For instance, the cable holder 160 may be double-injected while the first cable 130*a* and the first connection member or connector 150*a* are coupled. During the injection process, upper and lower ends of the connection member or connector 150*a* may be embedded in the connection part 161 of the cable holder 160.

In this regard, the first connection member or connector 150*a* may have a first upper through hole 153*a* penetrating the top surface of the first connection hole 152*a*, and a first lower through hole 154*a* penetrating the bottom surface of the first connection hole 152*a*. The first upper through hole 153*a* and the first lower through hole 154*a* increase the contact area between the connection part 161 and the first connection member or connector 150*a* when the cable holder 160 is double-injected while the first cable 130*a* and the first connection member or connector 150*a* are coupled. Accordingly, the first connection member or connector 150*a* may be stably fixed to the connection part 161 of the cable holder 160.

Meanwhile, the second to fourth connection members or connectors 150*b*, 150*c*, and 150*d* may have second to fourth upper through holes 153*b*, 153*c*, and 153*d* penetrating top surfaces of the second to fourth connection holes 152*b*, 152*c*, and 152*d*, and second to fourth lower through holes 154*b*, 154*c*, and 154*d* penetrating bottom surfaces of the second to fourth connection holes 152*b*, 152*c*, and 152*d*.

The second to fourth upper through holes 153*b*, 153*c*, and 153*d* and the second to fourth lower through holes 154*b*, 154*c*, and 154*d* increase the contact area between the connection part 161 and the second to fourth connection members or connectors 150*b*, 150*c*, and 150*d* when the cable holder 160 is double-injected while the second to fourth cables 130*b*, 130*c*, and 130*d* and the second to fourth connection members or connectors 150*b*, 150*c*, and 150*d* are coupled. Accordingly, the second to fourth connection members or connectors 150*b*, 150*c*, and 150*d* may be stably fixed to the connection part 161 of the cable holder 160.

The cable holder 160 supports the first to fourth cables 130*a*, 130*b*, 130*c*, and 130*d*. In other words, the first to fourth cables 130*a*, 130*b*, 130*c*, and 130*d* may be seated on the cable holder 160.

Referring to FIGS. 6 and 7, the cable holder 160 may include a connection part 161, a cable support part 162, and an additional sheathing member support part 163.

As described above, the cable holder 160 may be made by a double injection method in a state in which the first to fourth cables 130*a*, 130*b*, 130*c*, and 130*d* and the first to fourth connection members or connectors 150*a*, 150*b*, 150*c*, and 150*d* are coupled. In this case, the first to fourth connection members or connectors 150*a*, 150*b*, 150*c*, and 150*d* may be fixedly disposed in the cable holder 160. For example, as shown in FIG. 10, the first to fourth connection members or connectors 150*a*, 150*b*, 150*c*, and 150*d* may be embedded in the cable holder 160.

The connection part 161 has first to fourth through holes 162*a*, 162*b*, 162*c*, and 162*d* in which the first to fourth lead frames 112*a*, 112*b*, 112*c*, and 112*d* are inserted and disposed through the front of the first to fourth through holes 162*a*, 162*b*, 162*c*, and 162*d*, respectively, and each one end of the first to fourth conductive wires 131*a*, 131*b*, 131*c*, and 131*d* are inserted and disposed through the rear of the first to fourth through holes 162*a*, 162*b*, 162*c*, and 162*d*, respectively. The connection part 161 may have a box shape as a whole. In addition, the first to fourth through holes 162*a*, 162*b*, 162*c*, and 162*d* may pass through the connection part 161 in the front-rear direction and may be placed side by side with each other. For example, the first to fourth through holes 162*a*, 162*b*, 162*c*, and 162*d* may be arranged side by side in a horizontal direction.

First to fourth connection members or connectors 150*a*, 150*b*, 150*c*, and 150*d* may be fixedly disposed in the first to fourth through holes 162*a*, 162*b*, 162*c*, and 162*d*, respectively. That is, they may be fixedly disposed in the first to fourth through holes 162*a*, 162*b*, 162*c*, and 162*d*. As described above, first to fourth connection members or connectors 150*a*, 150*b*, 150*c*, and 150*d* may be embedded in the first to fourth through holes 162*a*, 162*b*, 162*c*, and 162*d*, respectively.

The cable support part 162 is extended to support the first to fourth cables 130*a*, 130*b*, 130*c*, and 130*d*. The cable support part 162 may be connected to the rear of the connection part 161.

The cable support part 162 may include a cable support plate 162*a* disposed to support the first to fourth cables 130*a*, 130*b*, 130*c*, and 130*d* from a lower side, and a cable support sidewall 162*b* extending upward from both sides of the cable support plate 162*a* to support the sides of the first to fourth cables 130*a*, 130*b*, 130*c*, and 130*d*.

The additional sheathing member support part 163 is connected to the rear of the cable support part 162. The additional sheathing member support part 163 supports the additional sheathing member 140. That is, the additional sheathing member 140 may be seated and supported on the additional sheathing member support part 163. The additional sheathing member support part 163 may have a ring shape with an open upper side so as to cover or surround a part of the outer circumferential surface of the additional sheathing member 140.

Figure 11:
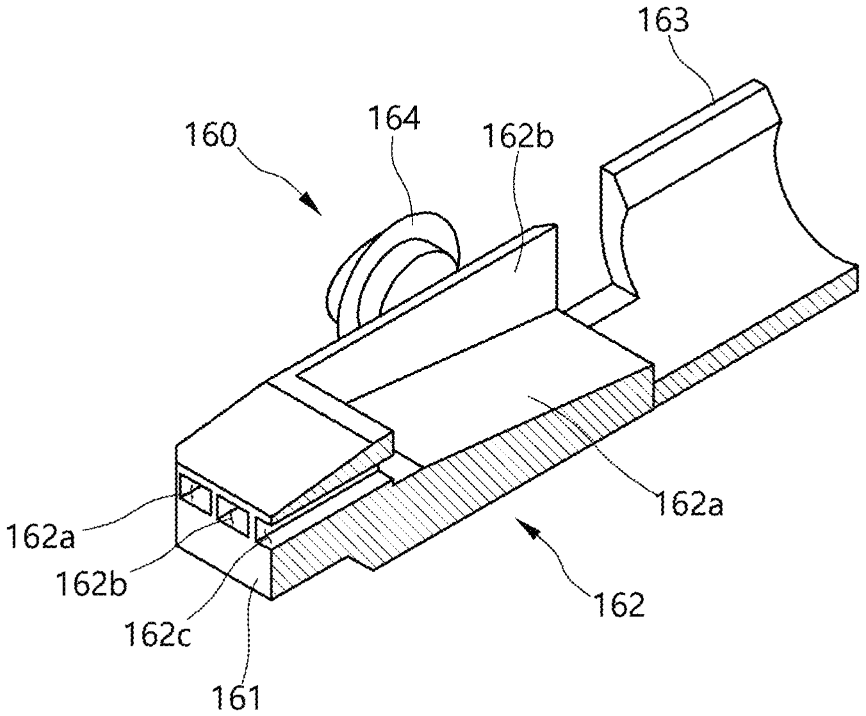
FIG. 11 is a longitudinal cross-sectional perspective view of a cable holder of a device for sensing wheel speed according to an exemplary embodiment of the present disclosure.

FIG. 11 is a longitudinal cross-sectional perspective view of a cable holder of a device for sensing wheel speed according to an exemplary embodiment of the present disclosure.

Referring to FIG. 11, in an embodiment of the present disclosure, the bottom surface of the cable support part 162 may include a portion inclined upward from the additional sheathing member support part 163 side to the connection part 161 side. In other words, the bottom surface of the cable support part 162 may include a portion inclined downward from the front to the rear. Alternatively, the bottom surface of the cable support part 162 may include a portion inclined upward from the rear to the front.

For example, the bottom surface of the cable support plate 162*a* of the cable support part 162 may include a portion inclined upward from the additional sheathing member support part 163 side to the connection part 161 side. In other words, the bottom surface of the cable support plate 162*a* may include a portion inclined downward from the front to the rear. Alternatively, the bottom surface of the cable support plate 162*a* may include a portion inclined upward from the rear to the front.

As mentioned earlier, the first to fourth cables 130*a*, 130*b*, 130*c*, and 130*d* may be arranged in two rows and two columns inside the additional sheathing member 140. Meanwhile, the first to fourth through holes 162*a*, 162*b*, 162*c*, and 162*d* may be arranged side by side in a horizontal direction.

As shown in FIGS. 4 and 6, the first cable 130*a* and the fourth cable 130*d* disposed on the upper side are disposed on the same horizontal plane as the first to fourth through holes 162*a*, 162*b*, 162*c*, and 162*d* of the connection part 161 so that they may easily enter the first through hole 162*a* and the fourth through hole 162*d*, respectively. However, the second cable 130*b* and the third cable 130*c* placed on the lower side are placed at a lower position than the first to fourth through holes 162*a*, 162*b*, 162*c*, and 162*d*, so the cables need to be bent upward to enter the second through hole 162*b* and the third through hole 162*c*.

As shown in FIG. 10, when the bottom surface of the cable support plate 162*a* of the cable support part 162 includes a portion inclined upward from the additional sheathing member support part 163 side to the connection part 161 side, the second cable 130*b* and the third cable 130*c* disposed on the lower side may be smoothly guided upward. Accordingly, the second cable 130*b* and the third cable 130*c* can easily enter the second through hole 162*b* and the third through hole 162*c*.

In an embodiment of the present disclosure, the cable holder 160 may have one or more side beams 164. The side beam 164 may be disposed to extend laterally from both sides of the cable support part 162. The side beam 164 may be used to fix the housing 170 in a mold when molding the housing 170.

The housing 170 accommodates the wheel speed sensor assembly 110, the wheel speed sensor holder 120, the first to fourth cables 130*a*, 130*b*, 130*c*, and 130*d*, the additional sheathing member 140, and the first to fourth connection members or connectors 150*a*, 150*b*, 150*c*, and 150*d*, and the cable holder 160.

The housing 170 may be formed by molding in a state in which the wheel speed sensor assembly 110, the wheel speed sensor holder 120, the first to fourth cables 130*a*, 130*b*, 130*c*, and 130*d*, the additional sheathing member 140, and the first to fourth connection members or connectors 150*a*, 150*b*, 150*c*, and 150*d*, and the cable holder 160 are combined.

In an embodiment of the present disclosure, the housing 170 may include a housing body 171 and a fastening member 172.

The housing body 171 accommodates the wheel speed sensor assembly 110, the wheel speed sensor holder 120, the first to fourth cables 130*a*, 130*b*, 130*c*, and 130*d*, the additional sheathing member 140, and the first to fourth connection members or connectors 150*a*, 150*b*, 150*c*, and 150*d*, and the cable holder 160 therein.

The fastening member 172 is a portion to which a fastening member for fastening the device for sensing wheel speed 100 to the vehicle body is coupled. The fastening member 172 may include a portion connected to the housing body 171 and extending downward. In addition, the fastening member 172 may include a through hole 173 for fastening the fastening member.

Figure 12:
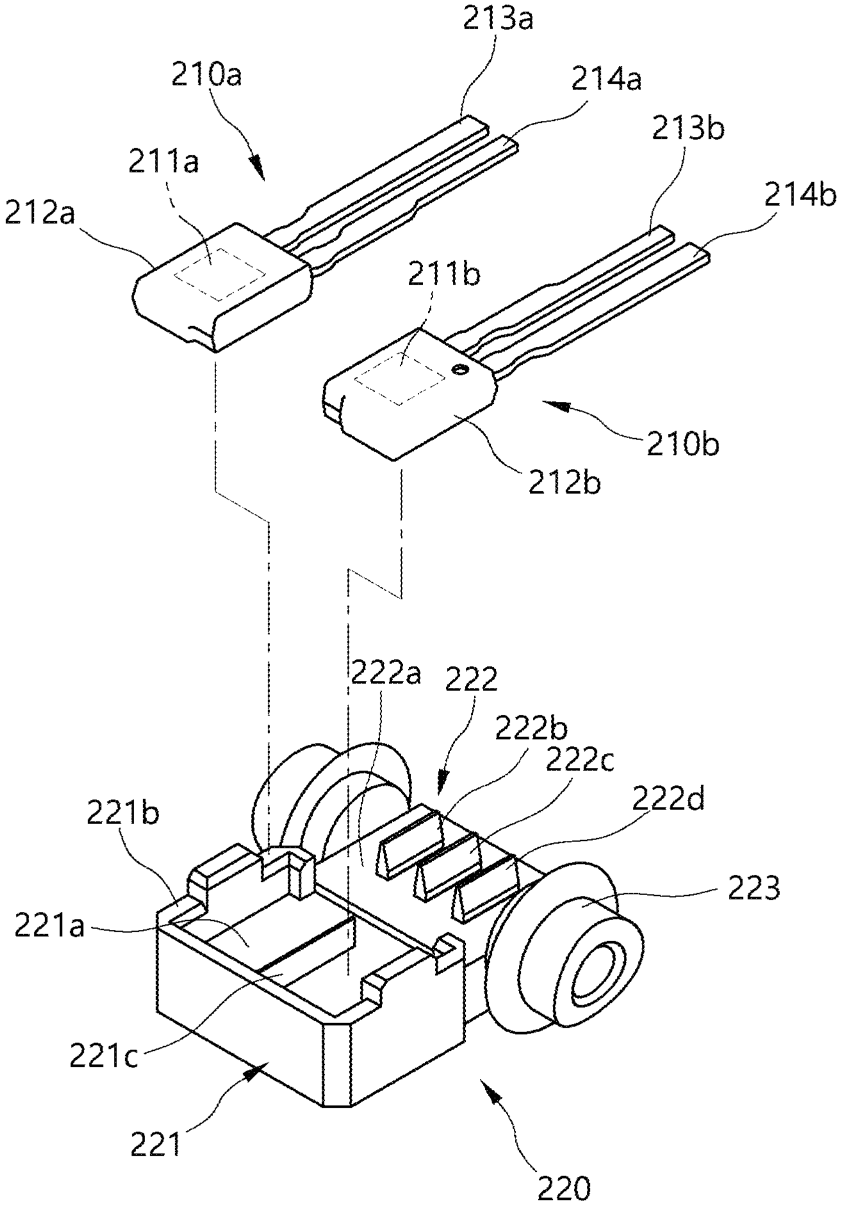
FIG. 12 is a view illustrating a modified example of a wheel speed sensor assembly and a wheel speed sensor holder of a device for sensing wheel speed according to an exemplary embodiment of the present disclosure.

FIG. 12 is a view illustrating a modified example of a wheel speed sensor assembly and a wheel speed sensor holder of a device for sensing wheel speed according to another exemplary embodiment of the present disclosure.

Referring to FIG. 12, in another embodiment of the present disclosure, in the case of the wheel speed sensor assembly, two sensor elements are not provided in a single sensor body, but may be provided independently.

A modified example of the present disclosure may include a first wheel speed sensor 210*a* and a second wheel speed sensor 210*b*.

In a modified example, the first wheel speed sensor 210*a* may include a first sensor body 212*a* in which a first sensor element 211*a* is disposed, and first and second lead frames 213*a* and 214*a* electrically connected to the first sensor element 211*a* and extending to the outside of the first sensor body 212*a*.

In a modified example, the second wheel speed sensor 210*b* may include a second sensor body 212*b* in which a second sensor element 211*b* is disposed, and third and fourth lead frames 213*b* and 214*b* electrically connected to the second sensor element 211*b* and extending to the outside of the second sensor body 212*b*.

In a modified example, the wheel speed sensor holder 220 may include a seating part 221 and a support part 222.

The seating part 221 accommodates the first wheel speed sensor 210*a* and the second wheel speed sensor 210*b*. The first wheel speed sensor 210*a* and the second wheel speed sensor 210*b* may be seated on the seating part 221.

In a modified example of an embodiment of the present disclosure, the seating part 221 may include a sensor seating plate 221*a* on which a bottom surface of the first wheel speed sensor 210*a* and the second wheel speed sensor 210*b* are seated, and a sensor support sidewall 221*b* protruding upward from the sensor seating plate 221*a* to support the side surfaces of the first wheel speed sensor 210*a* and the second wheel speed sensor 210*b*.

The sensor support sidewall 221*b* may be provided to surround or cover the remaining portions of the side surfaces of the first wheel speed sensor 210*a* and the second wheel speed sensor 210*b* except for a portion where the lead frame extends.

In addition, the seating part 221 may further include an intermediate wall 221*c* that divides a portion of the sensor seating plate 221*a* on which the first wheel speed sensor 210*a* and the second wheel speed sensor 210*b* are seated.

The support part 222 is connected to the seating part 221. The support part 222 supports the first and second lead frames 213*a* and 214*a*, and the third and fourth lead frames 213*b* and 214*b*. The support part 222 may have a shorter length than the first and second lead frames 213*a* and 214*a*, and the third and fourth lead frames 213*b* and 214*b*.

The support part 222 may include a lead frame support plate 222*a* supporting the first to fourth lead frames 213*a*, 214*a*, 213*b*, and 214*b*, and a plurality of lead frame support sidewalls 222*b*, 222*c*, and 222*d* protruding upward from the lead frame support plate 222*a* to support side surfaces of the first to fourth lead frames 213*a*, 214*a*, 213*b*, and 214*b* between the first lead frame 213*a* and the second lead frame 214*a*, between the second lead frame 214*a* and the third lead frame 213*b*, and between the third lead frame 213*b* and the fourth lead frame 214*b*.

In a modified example of an embodiment of the present disclosure, the wheel speed sensor holder 220 may have one or more side beams 223. The side beam 223 may be disposed to extend laterally from both sides of the seating part 221 or the support part 222. For example, the side beam 223 may be disposed to extend laterally from both sides of the lead frame support plate 222*a*. The side beam 223 may be used to fix the housing in a mold when molding the housing.

According to the above configuration, the device for sensing wheel speed according to an aspect of the present disclosure can efficiently achieve connection between a wheel speed sensor assembly and a cable through a connection member or connector.

In addition, the device for sensing wheel speed according to an aspect of the present disclosure may facilitate connection between a cable and a lead frame through a wheel speed sensor holder configured to expose the lead frame of a wheel speed sensor assembly to the outside.

In addition, the device for sensing wheel speed according to an aspect of the present disclosure can efficiently achieve connection between a wheel speed sensor assembly and a cable through a structure in which a lead frame of a wheel speed sensor assembly is inserted into a connection member or connector while the cable and the connection member or connector are coupled to a cable holder.

In addition, the device for sensing wheel speed according to an aspect of the present disclosure can effectively achieve connection between a plurality of sensor elements and a plurality of cables, arrangement and alignment of a plurality of cables through an additional sheathing member and a cable holder.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A device for sensing wheel speed, comprising:

a wheel speed sensor assembly having a sensor body in which a first sensor element configured to sense a wheel speed of a vehicle is embedded, and a first lead frame electrically connected to the first sensor element embedded in the sensor body and extending to an outside of the sensor body;

a first cable having a first conductive wire electrically connected to the first lead frame and a first sheath covering the first conductive wire; and a first connector covering at least a part of the first lead frame and one end of the first conductive wire that is exposed out of one end of the first sheath of the first cable and is disposed to contact the first lead frame, and fixedly supporting the first lead frame and the first conductive wire such that the first lead frame and the first conductive wire are fixed to be contacted with each other.

2. The device for sensing wheel speed of claim 1, wherein the first connector has a first connection body, and a first connection hole penetrating one side and another side of the first connection body, wherein the first lead frame and the one end of the first conductive wire are disposed to be contacted with each other in the first connection hole.

3. The device for sensing wheel speed of claim 2, wherein the first connection body has a substantially rectangular box shape, and the first connection hole has a substantially rectangular shape.

4. The device for sensing wheel speed of claim 1, wherein the wheel speed sensor assembly further has a second lead frame electrically connected to the first sensor element and extending to the outside of the sensor body, and wherein the device for sensing wheel speed further comprises:

a second cable having a second conductive wire electrically connected to the second lead frame and a second sheath covering the second conductive wire; and a second connector covering the second lead frame and one end of the second conductive wire that is exposed out of one end of the second sheath of the second cable and is disposed to contact the second lead frame, and fixedly supporting the second lead frame and the second conductive wire such that the second lead frame and the second conductive wire are fixed to be contacted with each other.

5. The device for sensing wheel speed of claim 4, wherein the first connector and the second connector are arranged side by side.

6. The device for sensing wheel speed of claim 4, further comprising a wheel speed sensor holder on which the wheel speed sensor assembly is seated.

7. The device for sensing wheel speed of claim 6, wherein the wheel speed sensor holder comprises:

a seat part on which the sensor body is seated; and a support part connected to the seat part and supporting the first and second lead frames.

8. The device for sensing wheel speed of claim 7, wherein a length of the support part is shorter than lengths of the first and second lead frames.

9. The device for sensing wheel speed of claim 4, further comprising a cable holder on which the first and second cables are seated.

10. The device for sensing wheel speed of claim 9, wherein the first and second connectors are fixedly disposed in the cable holder.

11. The device for sensing wheel speed of claim 10, wherein the cable holder comprises a connection part having first and second through holes, wherein the first and second lead frames are disposed in first ends of the first and second through holes of the connection part, respectively, the first and second conductive wires are disposed in second ends of the first and second through holes of the connection part, respectively, and the first and second connectors are fixedly disposed in the first and second through holes of the connection part, respectively.

12. The device for sensing wheel speed of claim 11, wherein the cable holder further comprises a cable support part connected to the second ends of the connection part and extending to support the first and second cables.

13. A device for sensing wheel speed, comprising:

a wheel speed sensor assembly having a sensor body in which a first sensor element and a second sensor element configured to sense a wheel speed of a vehicle which are embedded, and first and second lead frames electrically connected to the first sensor element and extending to an outside of the sensor body, and third and fourth lead frames electrically connected to the second sensor element and extending to the outside of the sensor body;

a first cable having a first conductive wire electrically connected to the first lead frame and a first sheath covering the first conductive wire;

a second cable having a second conductive wire electrically connected to the second lead frame and a second sheath covering the second conductive wire;

a third cable having a third conductive wire electrically connected to the third lead frame and a third sheath covering the third conductive wire;

a fourth cable having a fourth conductive wire electrically connected to the fourth lead frame and a fourth sheath covering the fourth conductive wire;

a first connector covering at least a part of the first lead frame and one end of the first conductive wire that is exposed out of one end of the first sheath of the first cable and is disposed to contact the first lead frame, and fixedly supporting the first lead frame and the first conductive wire such that the first lead frame and the first conductive wire are fixed to be contacted with each other;

a second connector covering at least a part of the second lead frame and one end of the second conductive wire that is exposed out of one end of the second sheath of the second cable and is disposed to contact the second lead frame, and fixedly supporting the second lead frame and the second conductive wire such that the second lead frame and the second conductive wire are fixed to be contacted with each other;

a third connector covering at least a part of the third lead frame and one end of the third conductive wire that is exposed out of one end of the third sheath of the third cable and is disposed to contact the third lead frame, and fixedly supporting the third lead frame and the third conductive wire such that the third lead frame and the third conductive wire are fixed to be contacted with each other;

a fourth connector covering at least a part of the fourth lead frame and one end of the fourth conductive wire that is exposed out of one end of the fourth sheath of the fourth cable and is disposed to contact the fourth lead frame, and fixedly supporting the fourth lead frame and the fourth conductive wire such that the fourth lead frame and the fourth conductive wire are fixed to be contacted with each other; and a cable holder having a connection part having first to fourth through holes, wherein the first to fourth lead frames are disposed in first ends of the first to fourth through holes of the connection part, respectively, the first to fourth conductive wires are disposed in second ends of the first to fourth through holes of the connection part, respectively.

14. The device for sensing wheel speed of claim 13, wherein the first to fourth connectors are fixedly disposed in the first to fourth through holes, respectively.

15. The device for sensing wheel speed of claim 13, wherein the first to fourth connectors are arranged side by side.

16. The device for sensing wheel speed of claim 13, wherein the first connector has a first connection body, and a first connection hole penetrating one side and another side of the first connection body, wherein the first lead frame and the one end of the first conductive wire are disposed to be contacted with each other in the first connection hole, and the second to fourth connectors have second to fourth connection bodies corresponding to the first connection body, and second to fourth connection holes corresponding to the first connection hole, respectively.

17. The device for sensing wheel speed of claim 16, wherein the first connection body has a substantially rectangular box shape, and the first connection hole has a substantially rectangular shape.

18. The device for sensing wheel speed of claim 13, further comprising a wheel speed sensor holder on which the wheel speed sensor assembly is seated.

19. The device for sensing wheel speed of claim 18, wherein the wheel speed sensor holder comprises:

a seat part on which the sensor body is seated; and a support part connected to the seat part and supporting the first to fourth lead frames.

20. The device for sensing wheel speed of claim 19, wherein a length of the support part is shorter than lengths of the first to fourth lead frames.

* * * * *